Sept. 22, 1953

T. K. NILAND 2,652,630

WIRE AND CABLE REWINDER

Filed March 28, 1949

Inventor
Thomas K. Niland

By Lester B. Clark
& Ray L. Smith

ATTORNEYS

Sept. 22, 1953 T. K. NILAND 2,652,630
WIRE AND CABLE REWINDER
Filed March 28, 1949 4 Sheets-Sheet 2

Inventor
Thomas K. Niland
By Lester B. Clark
 Ray L. Smith
ATTORNEYS

Sept. 22, 1953        T. K. NILAND        2,652,630
WIRE AND CABLE REWINDER
Filed March 28, 1949        4 Sheets-Sheet 3
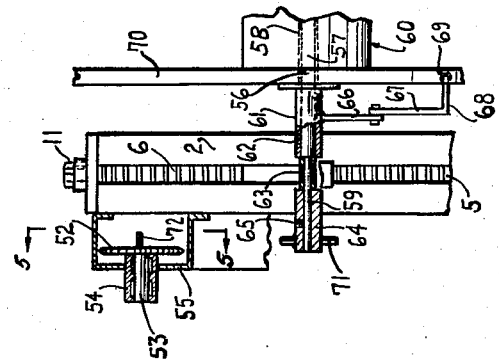
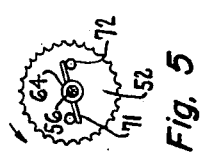
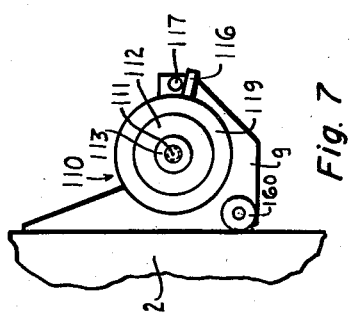
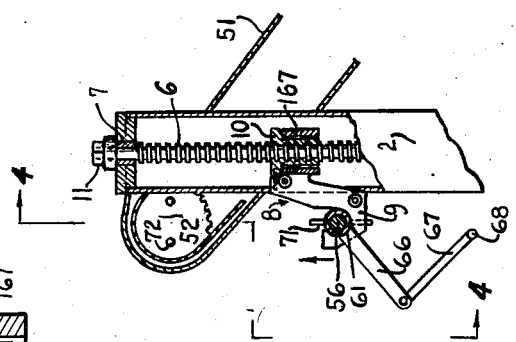
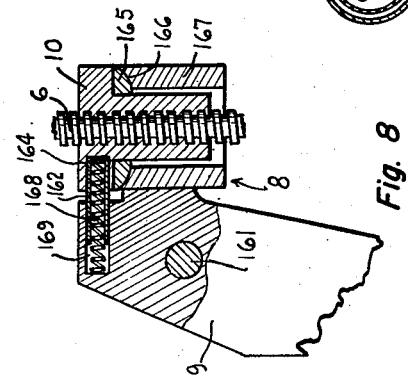
Inventor
Thomas K. Niland
By Lester B. Clark
& Ray L. Smith
ATTORNEYS Sept. 22, 1953
T. K. NILAND
2,652,630
WIRE AND CABLE REWINDER
Filed March 28, 1949
4 Sheets-Sheet 4
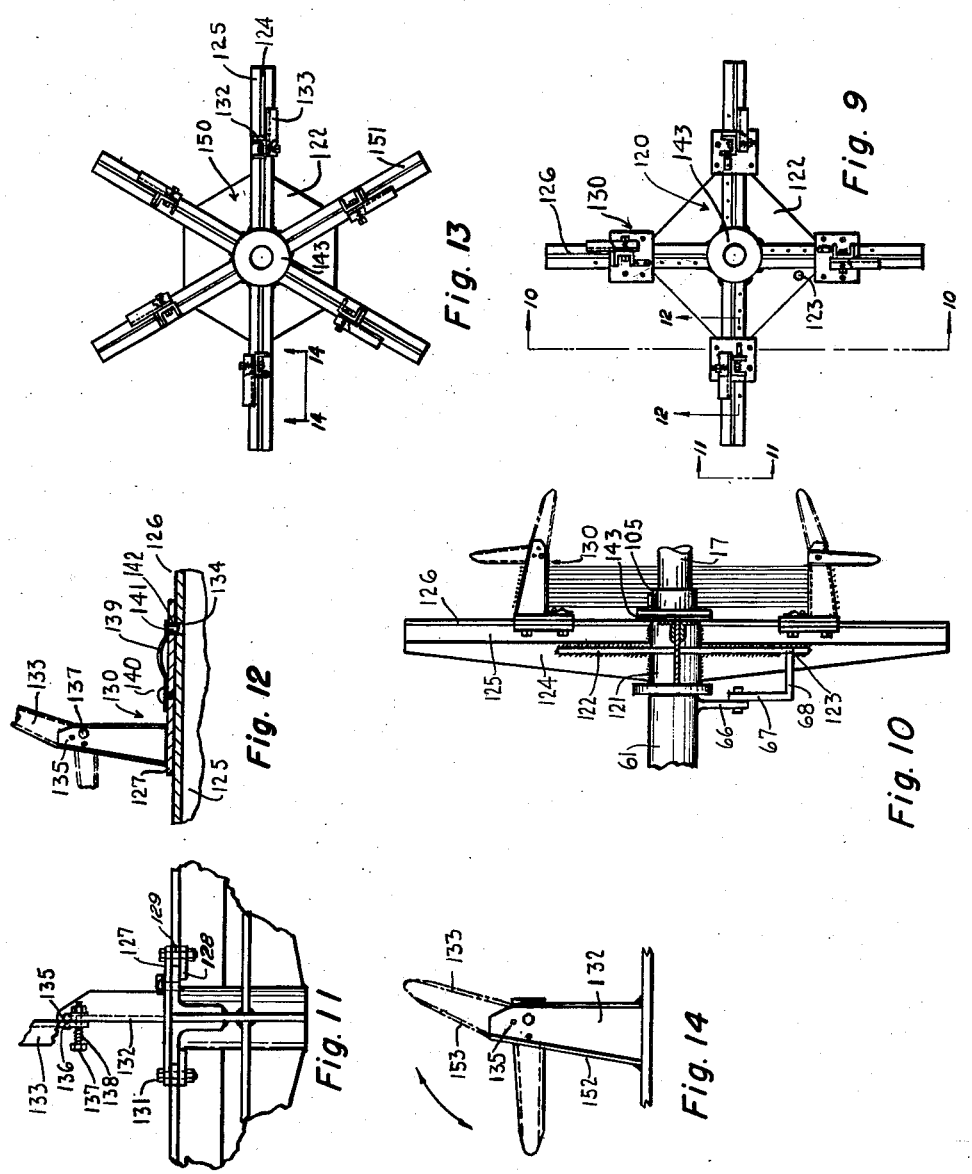
Inventor
Thomas K. Niland
By Lester B. Clark
& Ray L. Smith
ATTORNEYS Patented Sept. 22, 1953

2,652,630

UNITED STATES PATENT OFFICE 2,652,630

WIRE AND CABLE REWINDER

Thomas K. Niland, Houston, Tex.

Application March 28, 1949, Serial No. 83,829

2 Claims. (Cl. 33—129)

This invention relates to a wire and cable rewinder in combination with a metering device which is particularly adapted to handle and measure cable which may be received on a drum and measured as it is unwound therefrom onto a power-driven reel, or as it is unwound from the cable to measure out a desired length.

It is an object of this invention to provide such cable handling and measuring apparatus which is adapted to receive a cable drum and rotatably support it while it is passed through a metering gauge, the impulse which unwinds the cable being the power driven rotation of the reel which receives it as it is pulled through the gauge.

It is another object of this invention to provide an apparatus of this class in which the cable drum to be unwound and the reel to receive the cable may both be positioned by mechanically manipulated means both preparatory to, and after, the unwinding operation.

It is still another object of this invention to provide an apparatus of this class in which the metering gauge through which the cable passes to be measured may be manipulated to insure that it winds up evenly over the length of the receiving drum or reel.

It is a further object of this invention to control the speed at which the wire or cable is unwound by providing appropriate speed regulatory means upon the apparatus.

It is still a further object of this invention to provide the reel shaft of the apparatus with means thereon which engages with the driving means only when the reel is in position to be driven, the shaft also having adjustable means thereon to drive reels of various diameters.

It is still another object of this invention to provide an apparatus of this class which may be operated by a single operator.

It is yet a further object of this invention to provide an apparatus of this class in which the bearing hooks for lifting the cable are universally connected with the bearing hook journal on the cable lifting jack screw.

It is yet a further object of this invention to provide an apparatus of this class operable by a single operator who manipulates the metering gauge to insure even winding up of the cable on the reel while at the same time he has at hand the switch to stop the apparatus responsive to the indications of the meter discs.

It is still a further object of this invention to provide apparatus of this class which is adapted to receive and measure out a coil of wire as well as a wire drum.

It is yet a further object of this invention to provide coil handling apparatus of this class which is adapted to receive coils of different diameters.

It is also an object of this invention to provide apparatus of this class in which the individual dolly units may be operated separately as transportation unit.

It is still a further object of this invention to provide a method of speedily and easily measuring while transferring lengths of cable, wire, or of any type of flexible line from one reel, cable drum, or fixture, to another.

Other and further objects of this invention will be obvious when the specification is considered in connection with the drawings in which:

Fig. 3 is a fragmentary elevation, part in section, taken along line 3—3 of Fig. 1;

Fig. 4 is a fragmentary elevation, part in section, taken along line 4—4 of Fig. 3;

Fig. 5 is a fragmentary elevation taken along line 5—5 of Fig. 4, with the apparatus in driving engagement, and with the structure extraneous to the sprocket omitted for purposes of clarity;

Fig. 7 is an enlarged fragmentary elevation taken along line 7—7 of Fig. 6;

Fig. 8 is a sectional elevation taken along line 8—8 of Fig. 6;

Fig. 9 is an elevation of a modification corresponding in function to the pay out unit of Fig. 2;

Fig. 10 is a side elevation taken along line 10—10 of Fig. 9;

Fig. 11 is a side elevation taken along line 11—11 of Fig. 9;

Fig. 12 is a sectional view taken along line 12—12 of Fig. 9;

Fig. 13 is an elevation of a modification corresponding in function to the receiving unit of Fig. 2;

Fig. 14 is a view taken along line 14—14 of Fig. 13.

Figure 1:
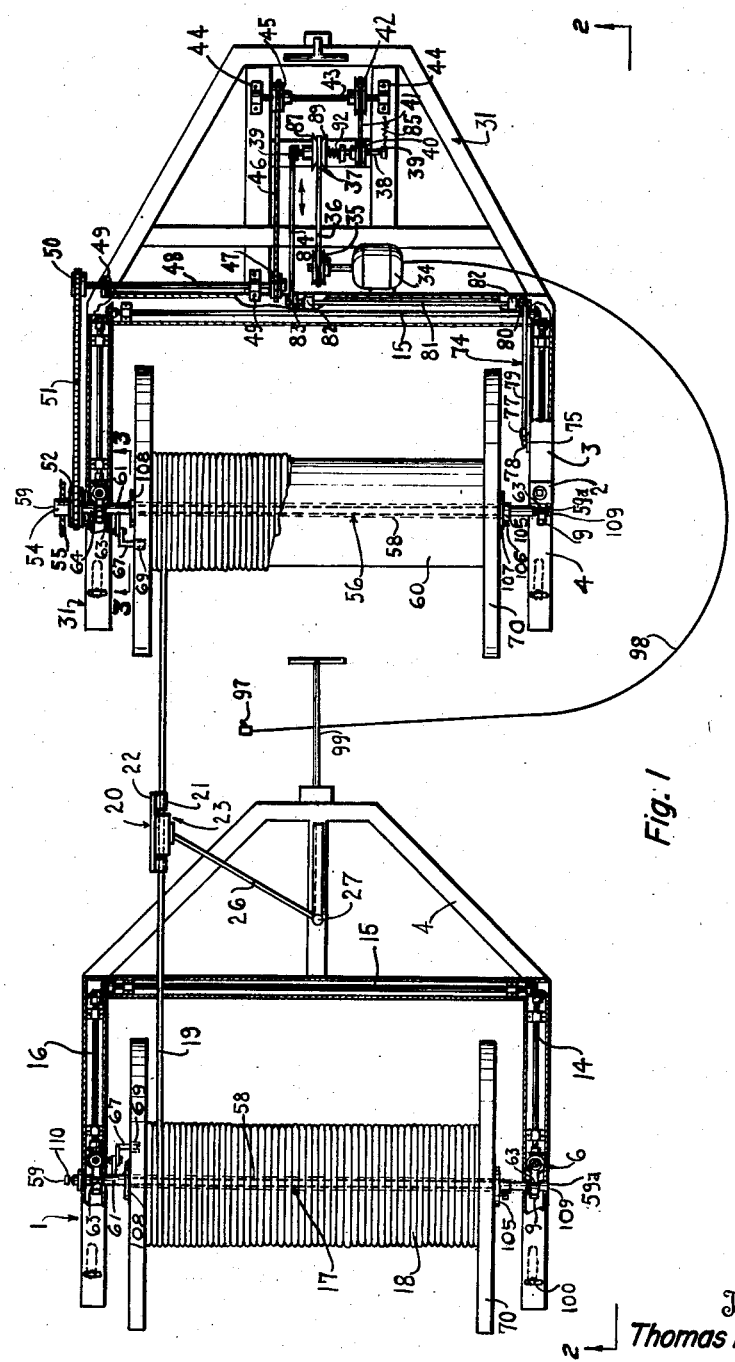
Fig. 1 is a plan view of the apparatus.
Figures 2, 6:
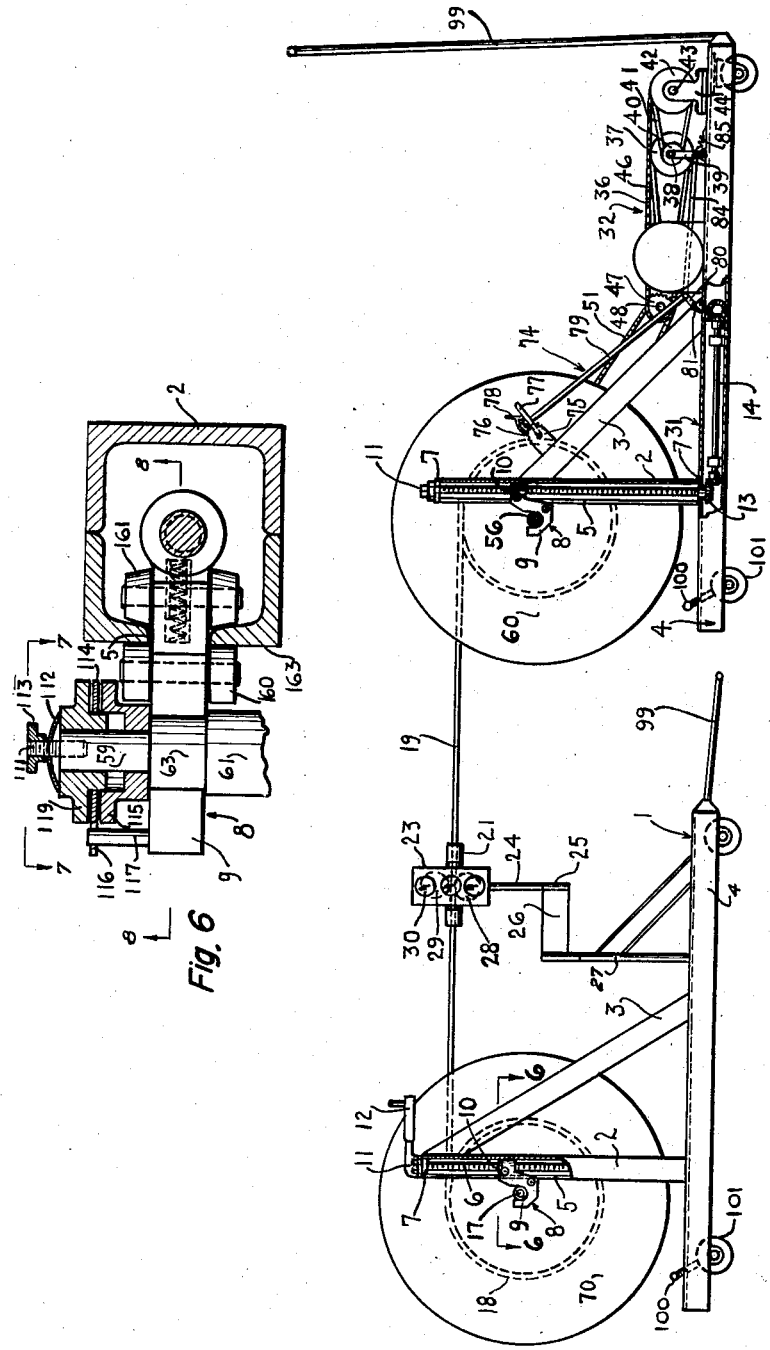
Fig. 2 is a side elevation of the apparatus taken along line 2—2 of Fig. 1 with part of the structure shown in section.
Fig. 6 is an enlarged plan detail taken along line 6—6 of Fig. 2 and on the far side of the cable drum.

As shown in Figs. 1 and 2, a dolly 1 has uprights 2 thereon which are maintained rigidly erect by the braces 3 between top of uprights and dolly base 4. The uprights are hollow and of substantially rectangular cross-section, and have slots 5 extending down the vertical length thereof. A jack screw 6 is supported for rotation by bearings 7 at the top and bottom, respectively, of the uprights, and prior to assembly of the jack screws and uprights, bearing hook assemblies 8, as shown more clearly in Figs. 3, 6, and 8, have their journals 10 threaded on to the jack screws so that upon assembly the hooks will ride in the slots 5 as will be hereinafter described. The hexagonal heads 11 of the jack screws 6 extend above the top bearings 7, and the socket wrench 12 may be fitted thereupon to rotate the jack screws with the result that the bearing hooks 9, being non-rotatably located in the slots 5, must move vertically along the screws upon such rotation.

In order that both bearing hooks 9 may be moved uniformly at the same elevation a bevel gear 13 is installed on the lower end of each jack screw 6, and these gears are interconnected for transmission purposes by the bevel-geared shafts 14, 15 and 16, mounted respectively in the right hand, front, and left hand elements of the base 4. In view of such connection it is obvious that a socket wrench 12 may be rotatably applied to either hexagonal jack screw end 11 to move both bearing hooks 9 at the same time so that they will travel vertically at the same elevation while being so moved.

It is thus possible to lower the bearing hooks 9 to a position at which the shaft 17, having the cable drum 18 thereon, may be positioned therein, after which the jack screws 6 may be rotated to raise the drum 18 to that elevation from which the cable 19 may be easily unwound.

The cable 19 from the drum 18 may be paid out through a receptacle 20 having pipe sections 21 at either end of a backing plate 22, the backing plate being in turn welded to the back side of a metering gauge 23. Such gauge has a shaft or spindle 24 extending therebelow, and terminates in a turned down end which rotatably bears in the bearing cylinder 25 of the pivot plate 26. The pivot plate in turn is rigidly connected to a spindle having a turned down end similar to spindle 24, and thus swivels on a swivel post 27 which is fixed to the dolly and extends vertically upward therefrom.

The metering gauge 23 is of any well known design, comprising the fixed lower wheel 28 over which the cable travels, and the top wheel 29 which is yieldably forced by spring pressure, not shown, against the cable, and which is adjustable by means not shown, to accommodate cables of various diameters. These gauge details, being conventional, are omitted as are the details of the gear train through which the lower wheel 28 actuates the meter discs 30 to indicate the length of cable paid out in three digits.

The second dolly 31 is of similar construction to the first dolly 3 as regards uprights, braces, and elements by which the bearing hooks 9 are moved vertically, but additionally this dolly has mounted thereon the driving mechanism 32 by which the reel 60 is driven.

The shaft of the motor 34 has a pulley 35 thereon which is connected by means of a V-belt 36 to drive the larger pulley 37 which is mounted on the shaft 38. This shaft 38 is supported by arms 39, which are pivotally mounted on the dolly 31.

The shaft 38 has thereon the pulley 40 which is connected by means of the V-belt 41 to drive the pulley 42 which is mounted on the shaft 43. This shaft 43 is supported by suitable bearings, as the pillow blocks 44, which are mounted on the dolly frame. The shaft 43 also has thereon the sprocket 45 which is connected by means of the chain 46 to drive the sprocket 47, which is mounted on the shaft 48. This shaft 48, in turn, is supported for rotation in suitable bearings 49 which are mounted on the dolly frame.

A sprocket 50 on shaft 48 is connected through chain 51 to drive the driving sprocket 52 on the stud 53. This stud 53 is journalled in the radial bearing unit 54, which is supported by the bracket 55 on the upright 2.

The shaft 56, as shown in Fig. 4, has a central section 57, and terminates in a turned down section or end 59. A collar 61 is fixed on end 59 of the shaft 56 by means of set screw 62. A lever 66 is welded to the collar 61. A roller bearing unit 63 is insertable over the turned down shaft section 59 to shoulder against the collar 61, and the driving collar 64, having the dog pins 71 thereon is finally installed on the end of the turned down section by means of the set screw 65.

The shaft 56, on its other end 59a, has a roller bearing unit 63 and an end collar 108 installed, and this end is then inserted through the cylindrical opening 58 through the reel, and the flanged collar 105 is then inserted over the end of the shaft, and the set screw 106 tightened to firmly hold the reel confined between the flange 107 of this collar and the flange 108 of the collar 61.

The lever arm 67 may then be pivotally connected to the lever 66, as shown in Figs. 1 and 3, so that the driving end 68 of the lever may be inserted into the driving hole 69 in the reel disc 70. As the reels 60 which may be employed are of various sizes and consequently have driving holes 69 spaced at various distances from the axes thereof, the lever arm 67 may be pivoted to fit the holes 69 on various sized reels.

With the shaft 56 in the reel 60, the assembly is rolled to the dolly 31 and is positioned to locate the roller bearings 63 above the bearing hooks 9. The bearing hooks 9 are then raised by means hereinabove described, to pick up the reel assembly so that the roller bearings 63 may be received in the arcuate portions of the bearing hooks to support the reel for rotation.

The bearing hooks are then raised to top position so that the dog pins 71 on the driving collar 64 may be positioned to be driven by the pins 72 on the drive sprocket 52, as shown in Fig. 5.

The shaft 17 is of identical construction to the shaft 56 as regards the central section 57 and the turned down ends 59 and 59a, and the units assembled thereon are essentially the same, with the exception that the end 59 of shaft 17, which has the sleeve 61 thereon, has substituted for the driving collar 64 of the shaft 56, the brake assembly 110.

As shown in Figs. 6 and 7, the brake 110 includes a stud 111 passing through the spring 112 and being rigidly fixed in the shaft end 59. The handle or nut 113 is threaded on the stud 111, and may be threaded down on the spring 112 to force the friction flange 113 against the disc 114, and the disc 114 against the face of the friction cup 115 which is keyed to the shaft end 59, so that in assembly it faces against the roller bearing unit 63 and the side of the bearing hook 9. The disc 114 has a pin 116 thereon which engages stop 117 to prevent the disc 114 from rotating with the cup 115.

In order to control the speed at which the reel 60 rotates, the speed control mechanism 74 is installed on the dolly 31. The bracket 75, having teeth 76 in the arcuate top portion thereof, is rigidly fixed to the brace 3, and the lever 77, of any well known design, is pivotally mounted thereon so that the latch 78 thereof may be brought into latching engagement with the various teeth 76. The rod 79 is pivotally connected to the lever 77 at one end, and at the other end is pivotally connected to the arm 80. The arm 80, in turn, is rigidly fixed to the shaft 81 which is supported for rotation on bearings 82 which are mounted on the dolly 31.

The arm 83, of the same size as the arm 80, is rigidly fixed to the end of the shaft 81 which is opposite from the arm 80, and extends parallel with the arm 80. The rod 84 is pivotally connected to the arm 83 at one end and to one of the arms 39 at the other end thereof.

The means employed to control speed ratio between motor 34 and the driving sprocket 52 may be any type of speed control mechanism which may be responsive to the actuation of the rod 79, and in the specific embodiment disclosed the speed control constitutes a V-belt speed change device of conventional design, described hereinafter in detail.

The spring 85 is attached to the arm 39 at one end and to the dolly 31 at the other to yieldably oppose the movement of the speed control mechanism 74 resulting from the rotation of the lever 77, say in a counter-clockwise direction, as shown in Fig. 2. Such counter-clockwise rotation pivots the arms 39 in the same counter-clockwise direction as viewed in Fig. 2.

The pulley 37 comprises the part 87 fixed on the shaft 36 and the part 89 which may move axially along the shaft on a key, not shown, and against the spring 92. Assuming a counter-clockwise movement of the arms 39, which would tend to create slack in the V-belt 36, the spring 92 will force the pulley part 89 toward the part 87 to take up this slack. In doing this the ratio of the pitch diameter of the pulley 37 to the pitch diameter of the pulley 35 is increased with the result that the speed of rotation of the reel 60 is decreased.

The line 98 leads from the motor 34 and has the switch 97 at the end thereof. The operator stands by the metering gauge 23 as the cable 19 is paid out therethrough, and swivels the gauge back and forth transversely of the direction of travel of the cable so that it winds up evenly on the reel 60. From such position he also observes the meter reading and at the same time he is accessible to the lever 77 to control the speed of rotation of the reel 60, and to actuate the switch 97 to stop the motor when desired, as when a certain meter reading is indicated.

The dollies 1 and 31 may be pulled, as by the handles 99, to any desired position where they may be connected for operation. To maintain them in fixed operative position the brake shafts 100, which are threadable in the dolly bases 4, may be screwed inwardly against the dolly wheels 101.

When it may not be practical to wind an amount of wire or cable on the receiving reel, the dolly 1 may be drawn to any desired location independently of the dolly 31, the brake 110 adjusted, and the cable or wire measured out manually, or drawn onto another power driven machine, as desired. Also, it may be desirable to by-pass the metering gauge on occasion.

Also, in cases where it is not desired to handle a whole drum or cable this invention may be readily adapted to handle smaller amounts as shown in Figs. 9-14.

An adjustable coil receiving fixture 120 is provided which has a central hub 121 to receive the shaft 17 and a plate 122 around the hub which has the hole 123 therein to receive the driving end 68 of the lever arm 67. Plates 124 at spaced intervals are connected to the hub 121 and extend radially therefrom and have angles 125 connected to either side thereof and to one end of the hub 121 to serve as the track 126 on which may be slidably mounted the brackets 130.

Each bracket 130 has a top plate 127 and under plate 128 with spacers 129 being inserted in between these plates; the assembly of plates and spacers being connected by bolts 131. A wire receiving member 132 is rigidly joined to each top plate 127, and extends perpendicularly therefrom. An arm 133 is mounted toward the end of each wire receiving member 132, and as shown in Fig. 14, this arm may take two positions as determined by the two locating holes 135. These holes receive the pin 136, rigidly connected to the arm 133, the arm being pivotally mounted by means of bolt 137 and spring 138 so that the forcing outwardly of the arm 133 compresses the spring 138 and permits the pin 136 to be lifted from one hole 135 to the other.

A plurality of spaced holes 134 are located along one angle 125 of each track 126. Each slidable bracket 130 has a spring 139 fixed at one end 140 to the top plate 127 of the bracket and at the other end the spring has a pin 141 rigidly fixed thereto. This pin 141 may extend through the hole 142 in the plate 127 to engage a hole 134 in the angle 125 to thereby locate the wire receiving member 132 at a radius from the axis of the hub 121 to receive a coil of desired diameter. The spring 139 is sufficiently strong to hold the pin 141 in engagement with the locating hole 134 in operation, yet is flexible enough to permit the spring to be lifted to withdraw the pin 141 for re-location of the member 132 when a different diameter of coil is to be handled.

The hub 121 has a plate 143 concentric with the axis thereof and fixed to the hub and angles 125 to form a bearing for the flanged collar 105 to position the fixture 120 on the shaft 17.

The fixture 150 is provided to be mounted on the shaft 56 to receive the wire as it is uncoiled from the coil on the fixture 120 on shaft 17. This fixture is of similar construction to fixture 120, except in place of the brackets 130 of fixture 120, it is only necessary to provide members 132 which are rigidly connected to the arms 151, since it is not necessary that these members be adjustably positioned.

It is a feature of the construction of the arms 133 that they are beveled at 153, and the receiving members 132 are also beveled at 152 so that the coils of wire or cable may be easily slid on and off the fixture.

The construction of the bearing hook assembly 8 is a special feature of this invention whereby the cable drums, reels, and coil fixtures may be speedily elevated with a minimum of friction. As shown most clearly in Figs. 3, 6, and 8, each upright 2 has a minimum clearance between the slot 5 to permit the sides of the slot to serve as guides for the bearing hook 9. The rollers 160 and 161 extend on each side of the bearing hook and ride respectively on the inside and outside of the side 163 of the upright.

As shown most clearly in Figs. 6 and 8, the bearing hook 9 is bored at 169 to receive the spring 168 and the flange 164 of the sleeve journal 10 is also bored, so that the sleeve 162 may be inserted to connect bearing hook 9 and journal 10. The spring 168 may then be inserted within the sleeve to bear at the bottom of the bore 169 and within the sleeve 162. The flange 164 of the sleeve journal 10 has an annular segment 165 therearound which is of a convexity to fit into the concave upper end 166 of the bearing cylinder 167. This bearing cylinder 167 is rigidly connected to the bearing hook 9 and extends around the sleeve journal 10 so as to leave a tolerance thereinbetween to allow for side play induced by any deviation from the vertical in the path of descent and ascent of the cable drum, reel, or coil.

As the journal 10 is moved upward by the rotation of the jack screw 6, the inter-action between the journal 10, and the bearing cylinder 167, as connected by the pin 162, is the feature of this invention which makes it easily possible for heavy cable drums and other loads to be lifted by the bearing hooks 9 with minimum friction between these assembled elements.

Broadly, this invention is applicable to the economical handling of cable drums, reels, and coils of various types and sizes, and is characterized by the provision of portable paying out and receiving units having a metering gauge interposed thereinbetween which may be actuated by a single operator to insure the even winding up of the cable or wire on the receiving unit. It is also within the scope of this invention to provide such units with positioning devices and with suitable braking, speed control, and stopping devices by which the single operator may control the operation of the apparatus.

What is claimed is:

1. In a device for handling line as wire and cable, the combination of, a dolly, uprights thereon, bearing means movably mounted on said uprights to receive a cable drum shaft for rotation therein, means associated with said uprights for manipulation to move said bearing means up and down between a lower drum loading and an upper cable transferring position, a second dolly, other uprights thereon, other bearing means movably mounted on said other uprights to receive a reel shaft for rotation therein, means associated with said other uprights for manipulation to move said other bearing means up and down between a lower reel loading and an upper cable receiving position, a metering gauge adapted to receive, measure, and record the length of cable which may be passed therethrough from said cable drum to said reel, swivel means for mounting said gauge on at least one of said dollies for manipulation so that said cable winds evenly upon said reel, speed-controlled, power driven means on said second dolly for driving said reel, and means connected to, and adapted for manipulation to stop said power driven means.

2. In a device for handling line as wire and cable, the combination of, a dolly, uprights thereon, bearing means movably mounted on said uprights to receive a shaft for rotation therein, a fixture adapted to receive coils of various diameters and adapted to be mounted on said shaft, means associated with said uprights for manipulation to move said bearing means up and down between a lower coil loading and an upper wire transferring position, a second dolly, other uprights thereon, other bearing means movably mounted on said other uprights to receive a second shaft for rotation therein, a second fixture for receiving wire and adapted to be mounted on said second shaft, means associated with said other uprights for manipulation to move said other bearing means up and down between a lower fixture loading and an upper wire receiving position, a metering gauge adapted to receive, measure, and record the length of wire which may be passed therethrough from said first fixture to said second fixture, swivel means for mounting said gauge on at least one of said dollies for manipulation so that said wire winds evenly upon said second fixture, speed-controlled, power driven means on said second dolly for driving said second shaft, and means connected to, and adapted for manipulation to stop said power driven means.

THOMAS K. NILAND.

References Cited in the file of this patent
UNITED STATES PATENTS

| Number | Name | Date |
|---|---|---|
| 439,720 | Claunch et al. | Nov. 4, 1890 |
| 543,823 | Allis | July 30, 1895 |
| 695,352 | Thompson | Mar. 11, 1902 |
| 1,230,009 | Mirfield et al. | June 12, 1917 |
| 1,365,710 | McIlwain et al. | Jan. 18, 1921 |
| 1,487,853 | Handley | Mar. 25, 1924 |
| 1,542,485 | Stevenson | June 16, 1925 |
| 1,692,037 | Halliburton | Nov. 20, 1928 |
| 1,825,218 | Van Hook | Sept. 29, 1931 |
| 1,828,425 | Matthews | Oct. 20, 1931 |
| 1,836,815 | Reeves | Dec. 15, 1931 |
| 1,884,184 | Pearson | Oct. 25, 1932 |
| 1,994,373 | Thorne | Mar. 12, 1935 |
| 2,250,007 | Campion | July 22, 1941 |
| 2,277,134 | Nelson | Mar. 24, 1942 |
| 2,412,508 | Jensen | Dec. 10, 1946 |